US010594686B2

(12) United States Patent
Nogawa

(10) Patent No.: US 10,594,686 B2
(45) Date of Patent: Mar. 17, 2020

(54) COMMUNICATION SYSTEM AND REGISTRATION SERVER

(71) Applicant: BROTHER KOGYO KABUSHIKI KAISHA, Nagoya-shi, Aichi-ken (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 232 days.

(21) Appl. No.: 15/874,954

(22) Filed: Jan. 19, 2018

(65) Prior Publication Data

US 2018/0212950 A1 Jul. 26, 2018

(30) Foreign Application Priority Data

Jan. 20, 2017 (JP) ................................. 2017-008481

(51) Int. Cl.
*H04L 29/06* (2006.01)
*H04W 12/06* (2009.01)
(Continued)

(52) U.S. Cl.
CPC .......... *H04L 63/083* (2013.01); *G06F 3/1204* (2013.01); *G06F 3/1231* (2013.01);
(Continued)

(58) Field of Classification Search
CPC . H04L 63/083; H04L 41/5041; G06F 3/1231; G06F 3/1289; G06F 3/1204;
(Continued)

(56) References Cited

U.S. PATENT DOCUMENTS

2009/0303531 A1* 12/2009 Abe ....................... G06Q 30/02
358/1.15
2010/0067037 A1* 3/2010 Takiyama ............... G06F 21/32
358/1.14
(Continued)

FOREIGN PATENT DOCUMENTS

JP 2015-018473 A 1/2015

*Primary Examiner* — Michael Pyzocha
(74) *Attorney, Agent, or Firm* — Scully, Scott, Murphy & Presser, PC

(57) ABSTRACT

A communication system includes a registration server, a management server and a first target device. When receiving destination information from a communication device, the registration server transmits authentication information to the communication device, transmits screen relating information to a destination indicated by the destination information, receives user information from the communication device and registers the user information therein. When receiving the authentication information from the communication device, the first target device transmits the authentication information and first device identification information to the management server. When receiving the authentication information and the first device identification information from the first target device, the management server registers the first device identification information therein. The user information in the registration server and the first device identification information in the management server are registered with being associated with each other.

18 Claims, 15 Drawing Sheets

(51) Int. Cl.
*H04N 1/00* (2006.01)
*H04N 1/44* (2006.01)
*G06F 3/12* (2006.01)
*H04L 12/24* (2006.01)

(52) U.S. Cl.
CPC .......... *G06F 3/1289* (2013.01); *G06F 3/1292* (2013.01); *H04L 41/5041* (2013.01); *H04N 1/00244* (2013.01); *H04N 1/00411* (2013.01); *H04N 1/4413* (2013.01); *H04W 12/06* (2013.01)

(58) Field of Classification Search
CPC ................ G06F 3/1292; H04N 1/4413; H04N 1/00244; H04N 1/00411; H04W 12/06
See application file for complete search history.

(56) References Cited

U.S. PATENT DOCUMENTS

| | | | | |
|---|---|---|---|---|
| 2010/0079785 A1* | 4/2010 | Emori | ................... | G06F 21/608 358/1.14 |
| 2010/0171973 A1* | 7/2010 | Kimura | ................. | G06F 3/1204 358/1.14 |
| 2011/0242598 A1* | 10/2011 | Ohara | ................... | G06F 3/1205 358/1.15 |
| 2012/0079081 A1* | 3/2012 | Parks | ................... | G06F 3/1236 709/220 |
| 2012/0117629 A1* | 5/2012 | Miyazawa | .............. | H04L 63/08 726/4 |
| 2013/0046970 A1* | 2/2013 | Abe | ................... | H04L 63/0428 713/152 |
| 2013/0070288 A1* | 3/2013 | Muranaka | ............ | G06F 3/1204 358/1.15 |
| 2014/0358681 A1* | 12/2014 | Satoh | ................. | G06Q 30/0255 705/14.53 |
| 2015/0002884 A1* | 1/2015 | Okumura | ................ | G06F 3/1292 358/1.14 |
| 2015/0007279 A1* | 1/2015 | Hattori | .................... | H04L 63/08 726/5 |
| 2015/0020169 A1 | 1/2015 | Mori | | |
| 2015/0036191 A1* | 2/2015 | Suzuki | .................. | G06F 3/1292 358/1.15 |
| 2015/0046451 A1* | 2/2015 | Yamada | .............. | G06F 9/44505 707/736 |
| 2015/0121540 A1* | 4/2015 | Citron | .................... | G06F 21/10 726/27 |
| 2015/0234621 A1* | 8/2015 | Kimura | ................. | G06F 3/1203 358/1.15 |
| 2015/0317108 A1* | 11/2015 | Hadano | ................. | G06F 3/1203 358/1.15 |
| 2016/0112422 A1* | 4/2016 | Watanabe | ............. | H04W 12/06 726/28 |
| 2016/0224947 A1* | 8/2016 | Ishimaru | ................ | G06Q 10/20 |
| 2016/0295037 A1* | 10/2016 | Kawai | ................ | H04N 1/00204 |
| 2017/0178225 A1* | 6/2017 | Suzuki | ............... | H04N 1/32539 |
| 2018/0027146 A1* | 1/2018 | Kato | ................ | H04N 1/4433 358/1.14 |
| 2018/0096155 A1* | 4/2018 | Ryu | ......................... | G06F 3/12 |
| 2018/0324170 A1* | 11/2018 | Chen | ...................... | H04L 61/15 |

* cited by examiner

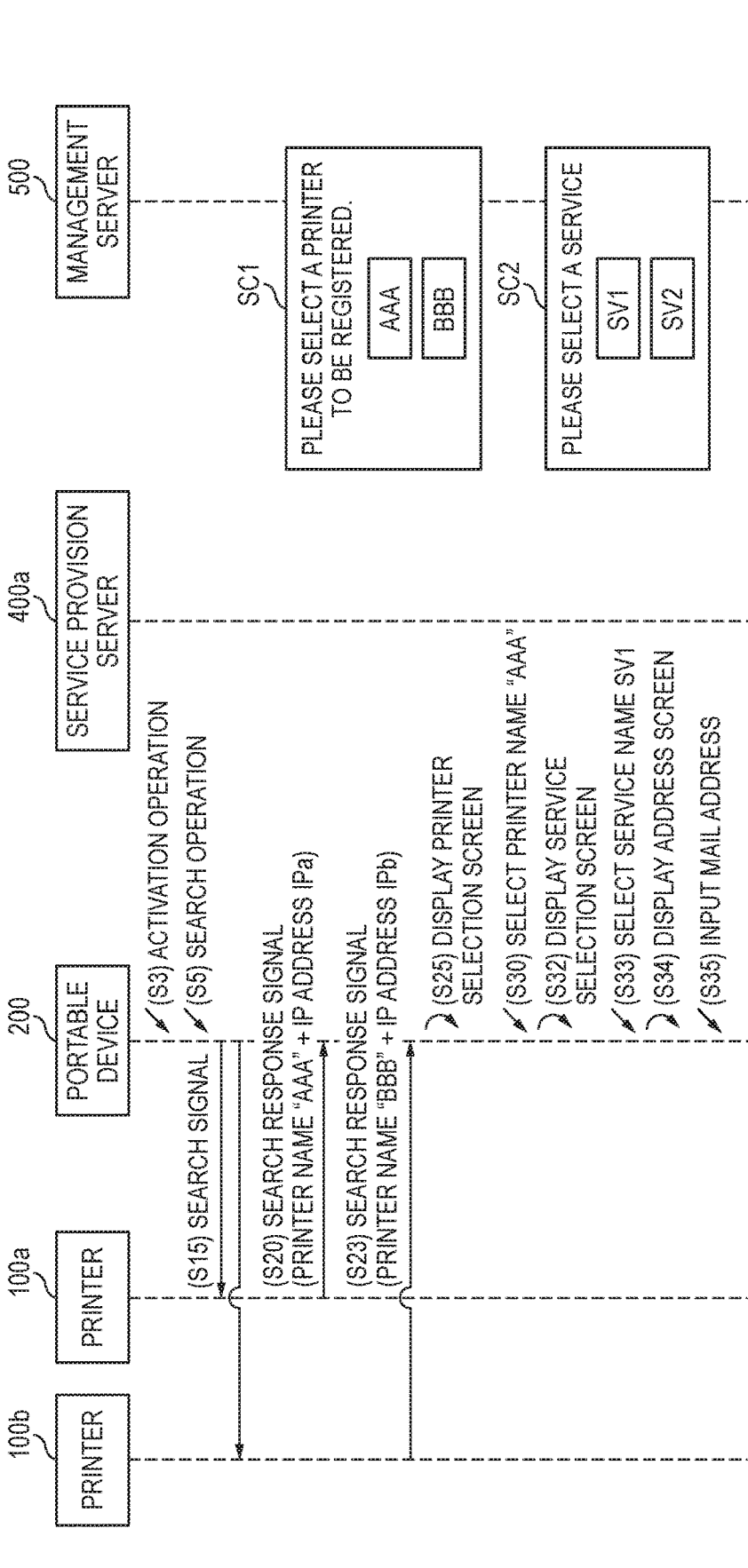

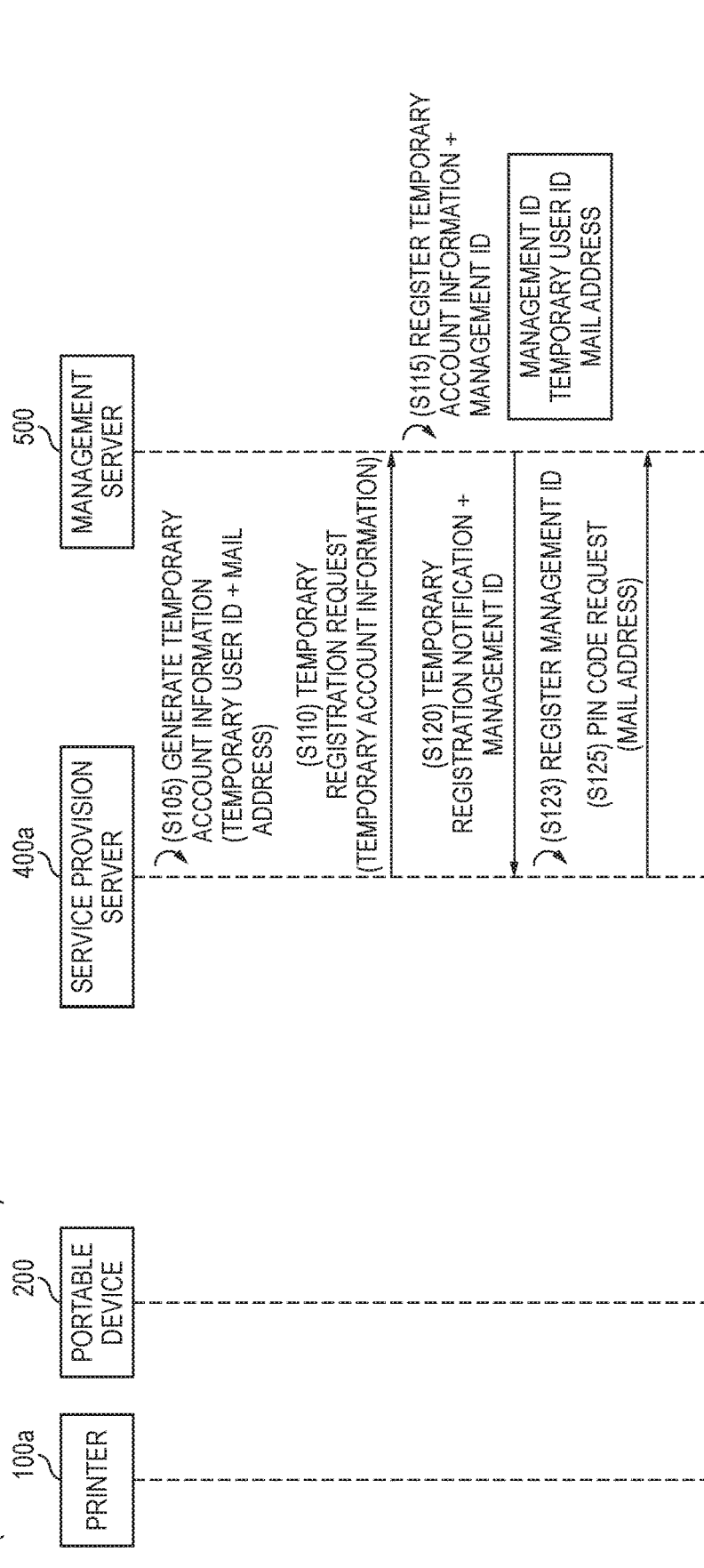

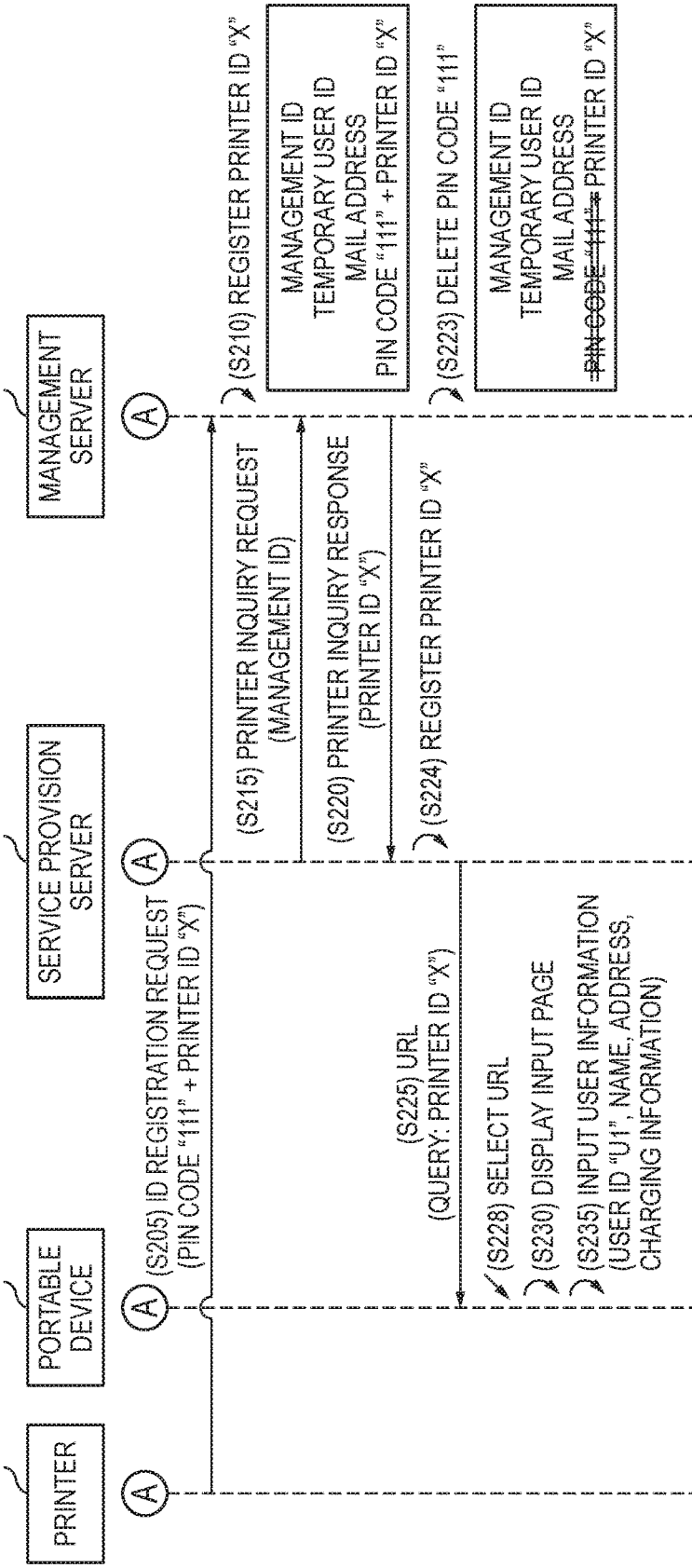

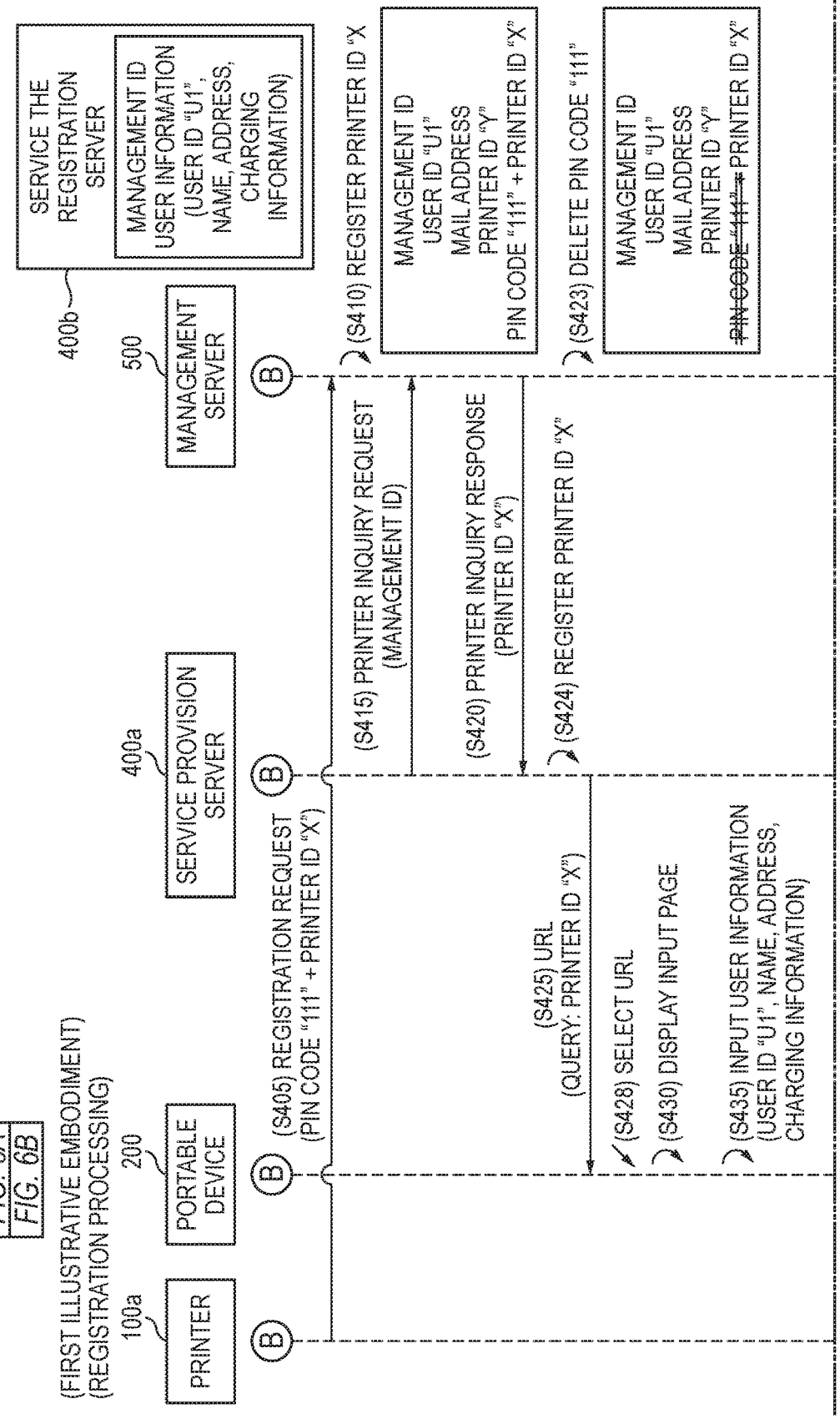

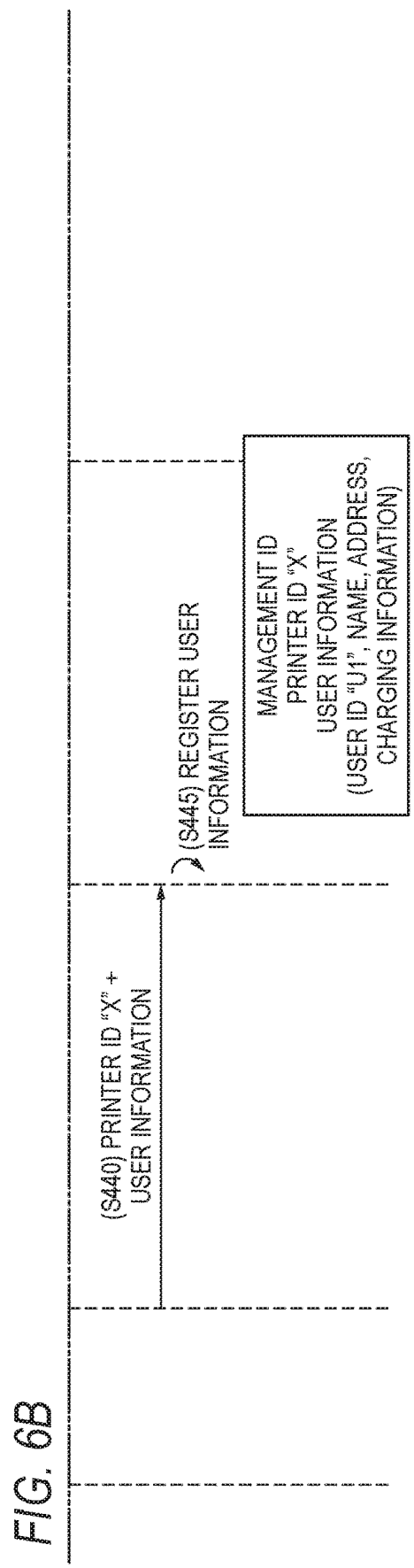

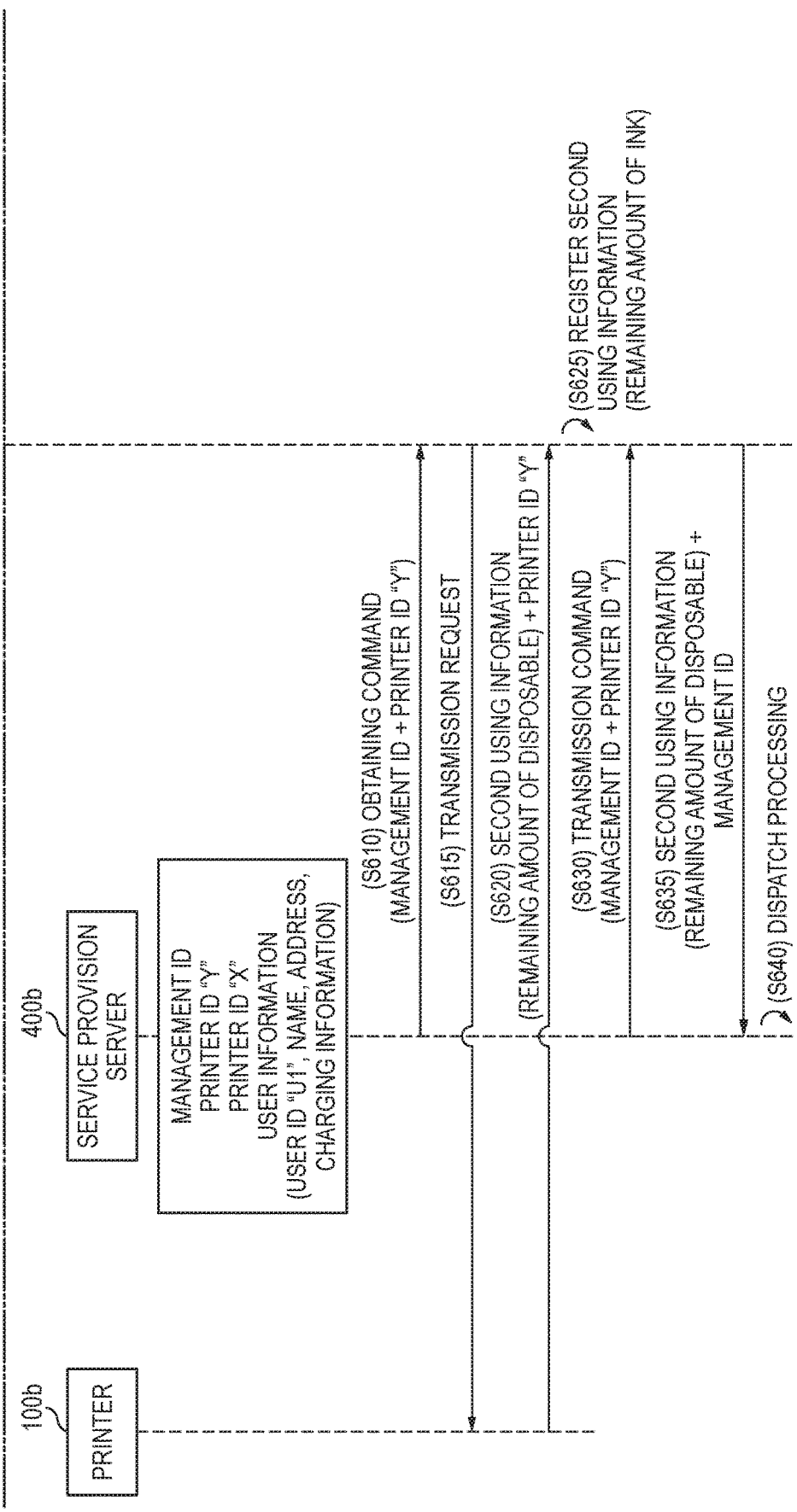

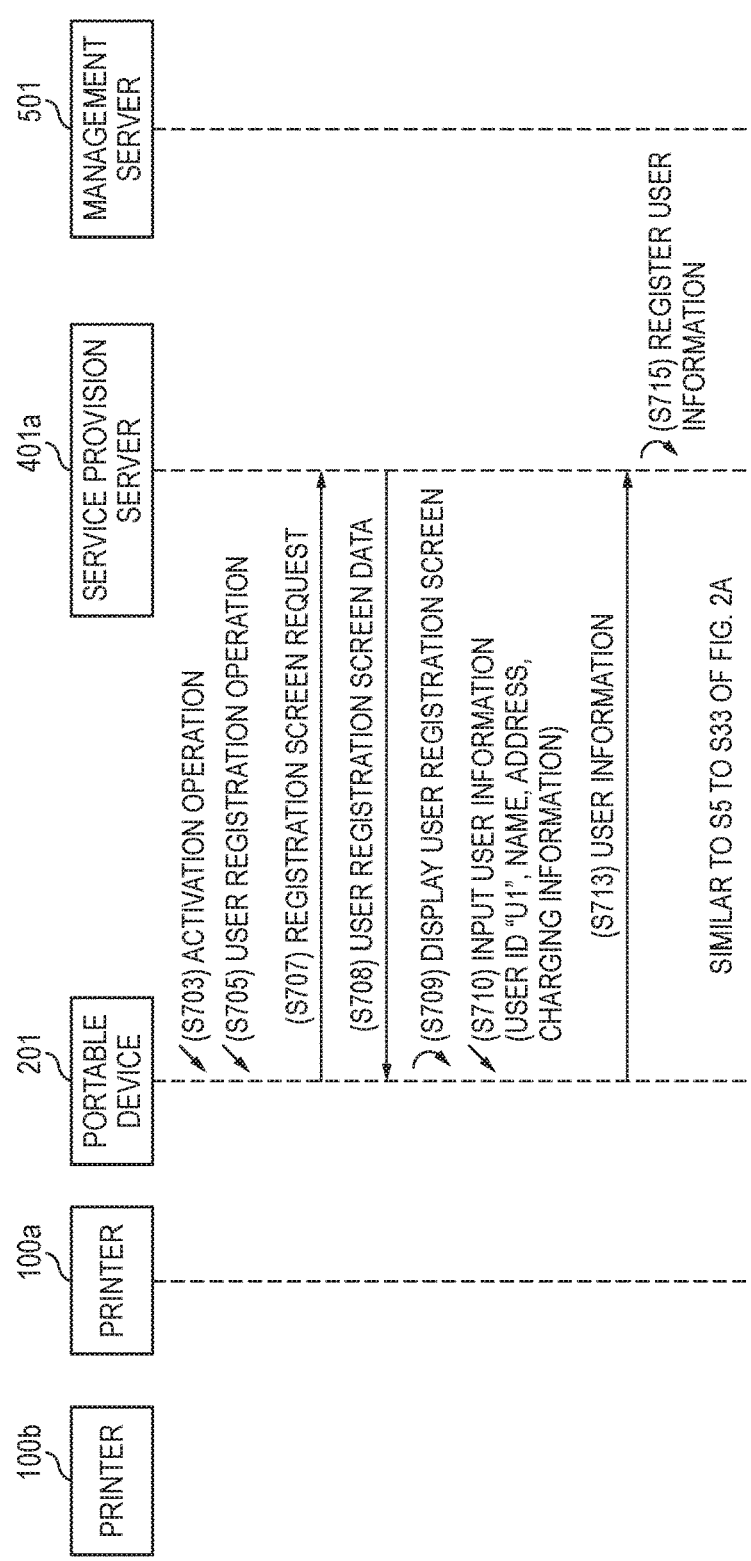

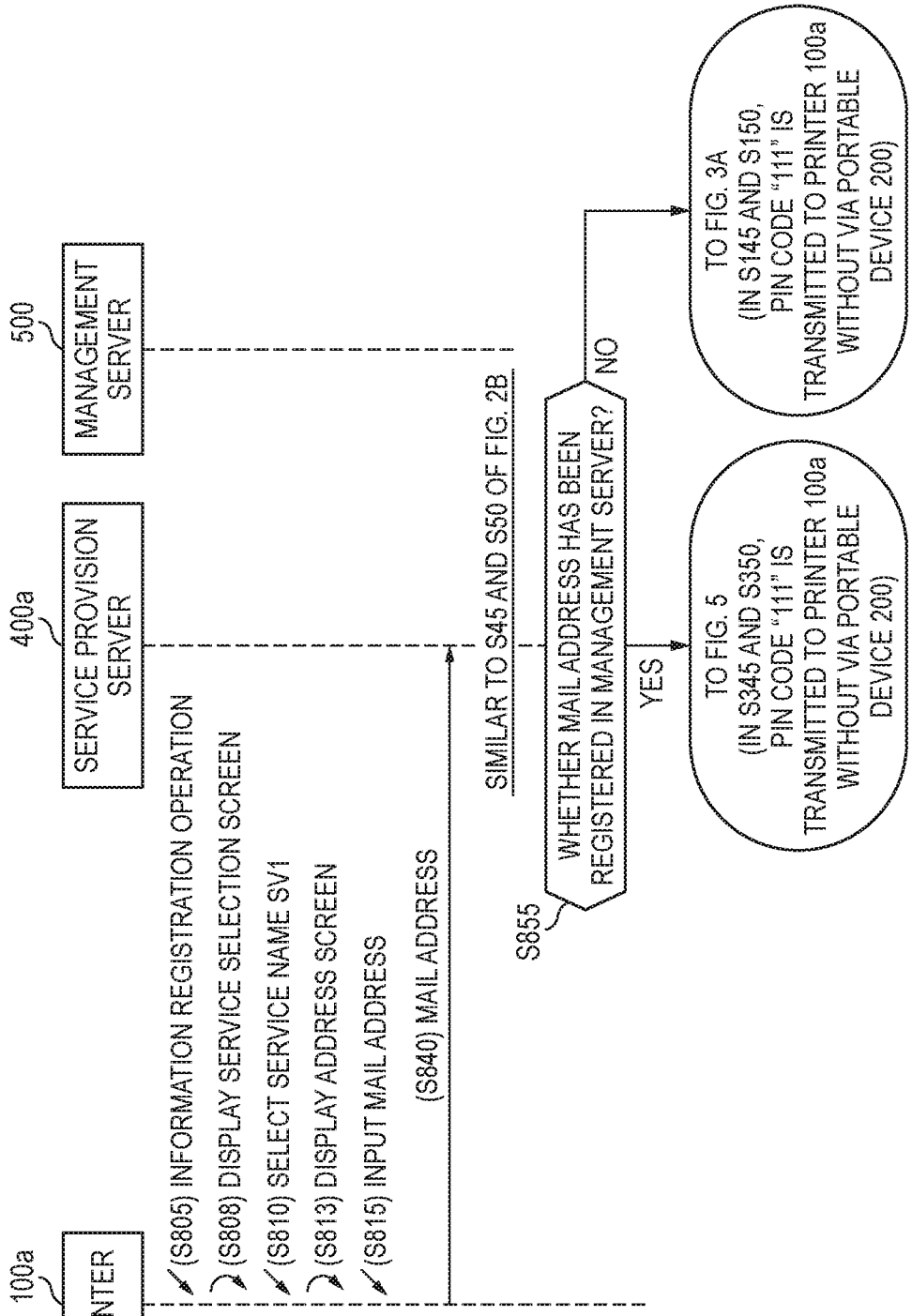

COMMUNICATION SYSTEM AND REGISTRATION SERVER

CROSS-REFERENCE TO RELATED APPLICATION

This application claims priority from Japanese Patent Application No. 2017-008481 filed on Jan. 20, 2017, the entire subject-matter of which is incorporated herein by reference.

TECHNICAL FIELD

The disclosure relates to a technology for registering information in a server.

BACKGROUND

There has been disclosed a technology of registering a user ID and a device ID in a management server and registering the user ID and a password in a registration server. That is, according to the related-art technology, it is possible to associate and register the device ID and the user information (i.e., the user ID and the password) via the user ID.

SUMMARY

The disclosure discloses a novel technology for associating and registering user information for specifying a user of a target device and device identification information for identifying the target device.

According to one illustrative aspect, there may be provided a communication system comprising: a registration server; an information management server; and a first target device. The registration server may comprise: a processor; and a memory storing instructions, the instructions, when executed by the processor, causing the registration server to perform: receiving, from a communication device, destination information of a user of the first target device; in response to receiving the destination information from the communication device, transmitting authentication information to the communication device and transmitting screen relating information to a destination indicated by the destination information, the screen relating information relating to an input screen for inputting user information specifying the user; in response to the input screen being displayed on the communication device corresponding to the destination indicated by the destination information and the communication device receiving the user information through the input screen, receiving the user information from the communication device; and in response to receiving the user information from the communication device, registering the user information in the memory of the registration server. The first target device may comprise: a control device configured to: receive the authentication information from the communication device after the communication device receives the authentication information from the registration server; and in response to receiving the authentication information from the communication device, transmit the authentication information and first device identification information to the information management server, the first device identification information identifying the first target device. The information management server may comprise: a processor; and a memory storing instructions, the instructions, when executed by the processor, causing the information management server to perform: receiving the authentication information and the first device identification information from the first target device; and in response to receiving the authentication information and the first device identification information from the first target device, registering the first device identification information in the memory of the information management server. The user information in the memory of the registration server and the first device identification information in the memory of the information management server may be registered with being associated with each other.

According to the above configuration, when the destination information is received from the communication device, the registration server transmits the authentication information to the communication device. When the authentication information is received from the communication device, the first target device transmits the authentication information and the first device identification information to the information management server. When the authentication information and the first device identification information are received from the first target device, the information management server registers the first device identification information in the memory of the information management server. Also, when the destination information is received from the communication device, the registration server transmits the screen relating information to the destination indicated by the destination information, receives the user information from the communication device, and registers the user information in the memory of the registration server. Thereby, the user information in the memory of the registration server and the first device identification information in the memory of the information management server can be registered with being associated with each other.

According to another illustrative aspect, there may be provided a communication system comprising: a registration server; an information management server; and a first target device. The registration server may comprise: a processor; and a memory storing instructions, the instructions, when executed by the processor, causing the registration server to perform: receiving, from the first target device, destination information of a user of the first target device; in response to receiving the destination information from the first target device, transmitting authentication information to the first target device and transmitting screen relating information to a destination indicated by the destination information, the screen relating information relating to an input screen for inputting user information specifying the user; in response to the input screen being displayed on the communication device corresponding to the destination indicated by the destination information and the communication device receiving the user information through the input screen by the user, receiving the user information from the communication device; and in response to receiving the user information from the communication device, registering the user information in the memory of the registration server. The first target device may comprise: a control device configured to: receive the authentication information from the registration server; and in response to receiving the authentication information from the registration server, transmit the authentication information and first device identification information to the information management server, the first device identification information identifying the first target device. The information management server may comprise: a processor; and a memory storing instructions, the instructions, when executed by the processor, causing the information management server to perform: receiving the authentication information and the first device identification information from the first target device; and in response to receiving the authentication information and the first device identification information from the first target device, registering the first device identification information in the memory of the information management server. The user information in the memory of the registration server and the first device identification information in the memory of the information management server may be registered with being associated with each other.

According to the above configuration, when the destination information is received from the first target device, the registration server transmits the authentication information to the first target device. When the authentication information is received from the registration server, the first target device transmits the authentication information and the first device identification information to the information management server. When the authentication information and the first device identification information are received from the first target device, the information management server registers the first device identification information in the memory of the information management server. Also, when the destination information is received from the first target device, the registration server transmits the screen relating information to the destination indicated by the destination information, receives the user information from the communication device, and registers the user information in the memory of the registration server. Thereby, the user information in the memory of the registration server and the first device identification information in the memory of the information management server can be registered with being associated with each other.

According to still another illustrative aspect, there may be provided a registration server comprising: a processor; and a memory storing instructions, the instructions, when executed by the processor, causing the registration server to perform: receiving, from a communication device, destination information of a user of a first target device; and in response to receiving the destination information from the communication device, associating and registering user information specifying the user and first device identification information specifying the first target device. The registering of the user information may comprise: transmitting authentication information to the communication device, wherein in response to transmitting the authentication information to the communication device, the first target device receives the authentication information from the communication device, and an information management server receives the authentication information and the first device identification information from the first target device; transmitting screen relating information to a destination indicated by the destination information, the screen relating information relating to an input screen for inputting the user information; and in response to the input screen being displayed on a communication device corresponding to the destination indicated by the destination information and the communication device receiving the user information through the input screen, receiving the user information from the communication device. In response to the information management server receiving the authentication information and the first device identification information from the first target device and the registration server receiving the user information from the communication device, the user information and the first device identification information may be registered with being associated with each other.

According to the above configuration, when the destination information is received from the communication device, the registration server transmits the authentication information to the communication device. As a result, the authentication information is received at the first target device from the communication device, and the authentication information and the first device identification information are received at the information management server from the first target device. Also, when the destination information is received from the communication device, the registration server transmits the screen relating information to the destination indicated by the destination information, and receives the user information from the communication device. Thereby, the registration server can associate and register the user information and the first device identification information.

According to still another illustrative aspect, there may be provided a registration server comprising: a processor; and a memory storing instructions, the instructions, when executed by the processor, causing the registration server to perform: receiving, from the first target device, destination information of a user of a first target device; and in response to receiving the destination information from the first target device, associating and registering user information specifying the user and first device identification information specifying the first target device. The registering of the user information may comprise: transmitting authentication information to the first target device, wherein in response to transmitting the authentication information to the first target device, the information management server receives the authentication information and the first device identification information from the first target device; transmitting screen relating information to a destination indicated by the destination information, the screen relating information relating to an input screen for inputting the user information; and in response to the input screen being displayed on a communication device corresponding to the destination indicated by the destination information and receiving the user information through the input screen, receiving the user information from the communication device. In response to the information management server receiving the authentication information and the first device identification information from the first target device and the registration server receiving the user information from the communication device, the user information and the first device identification information may be registered with being associated with each other.

According to the above configuration, when the destination information is received from the first target device, the registration server transmits the authentication information to the first target device. As a result, the authentication information and the first device identification information are received at the information management server from the first target device. Also, when the destination information is received from the communication device, the registration server transmits the screen relating information to the destination indicated by the destination information, and receives the user information from the communication device. Thereby, the registration server can associate and register the user information and the first device identification information.

A control method, a computer program, and a computer-readable recording medium having the computer program stored therein for implementing the communication system are also novel and useful. Also, a control method, a computer program, and a computer-readable recording medium having the computer program stored therein for implementing the registration server are also novel and useful.

BRIEF DESCRIPTION OF THE DRAWINGS

FIGS. 2A and 2B depict a registration processing sequence diagram of a first illustrative embodiment;

FIGS. 3A and 3B depict a sequence diagram of a case where a mail address has not been registered in a management server;

FIGS. 4A and 4B depict a sequence diagram continuing from FIG. 3B;

FIGS. 6A and 6B depict a sequence diagram continuing from FIG. 5;

FIGS. 7A and 7B depict a sequence diagram of service processing of the first illustrative embodiment;

FIGS. 8A and 8B depict a sequence diagram of a comparative example; and

FIG. 9 depicts a sequence diagram of registration processing of a second illustrative embodiment.

DETAILED DESCRIPTION

Figure 1:
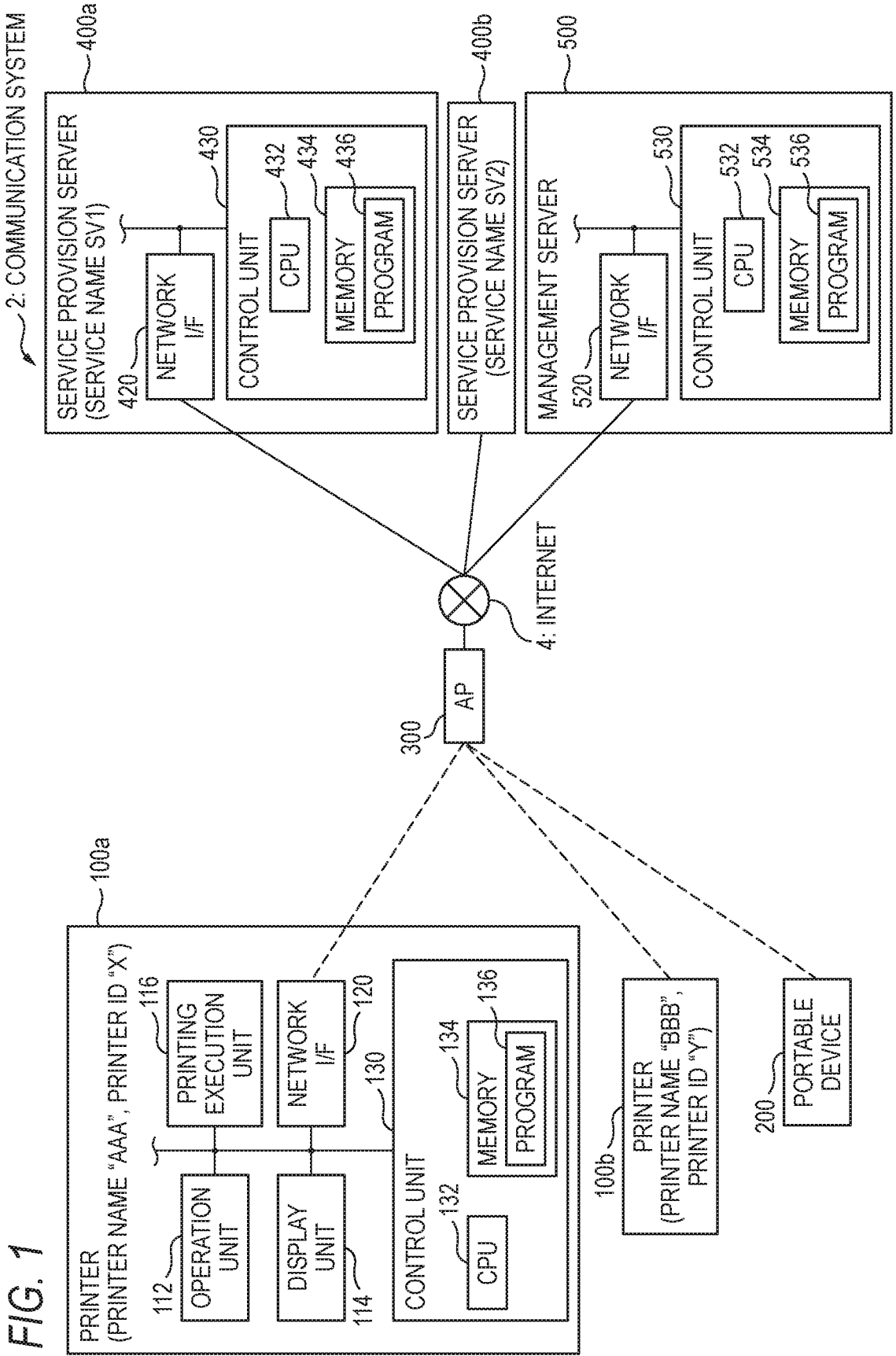
FIG. 1 depicts a configuration of a communication system.

First Illustrative Embodiment (Configuration of Communication System 2; FIG. 1)

As shown in FIG. 1, a communication system 2 includes a plurality of printers 100a, 100b, a plurality of service provision servers 400a, 400b, and a management server 500, which is provided separately from the service provision servers 400a, 400b. Each of the devices 100a, 100b is connected to a wireless LAN (abbreviation of Local Area Network) formed by an AP (abbreviation of Access Point) 300. A portable device 200 is also connected to the wireless LAN. Each of the devices 100a, 100b, 200 can perform communication with each other via the AP 300.

Each of the servers 400a, 400b, 500 is provided on the Internet 4. Each of the devices 100a, 100b, 200 can perform communication with each of the servers 400a, 400b, 500 on the Internet 4 via the AP 300.

(Configuration of Printers 100a, 100b)

Each of the printers 100a, 100b is a peripheral device capable of executing a printing function (i.e., a peripheral device of the portable device 200 and the like). The printer 100a has a printer name "AAA" and a printer ID "X". The printer 100b has a printer name "BBB" and a printer ID "Y". In the first illustrative embodiment, it is assumed that each of the printers 100a, 100b is to be used by the same user.

The printer 100a includes an operation unit 112, a display unit 114, a printing execution unit 116, a network interface 120, and a control unit 130. The operation unit 112 has a plurality of keys. A user can input a variety of instructions to the printer 100a by operating the operation unit 112. The display unit 114 is a display for displaying various kinds of information. The display unit 114 functions as a so-called touch panel, too. That is, the display unit 114 functions as an operation unit, too. The printing execution unit 116 is an inkjet or laser printing mechanism, for example. The network interface 120 is an interface for performing wireless communication, and is connected to the wireless LAN formed by the AP 300. In a modified embodiment, the network interface 120 may be an interface for performing communication in a wired manner and may be connected to a wired LAN. That is, each of the devices 100a, 100b, 200 may perform communication with each other via the wired LAN. Hereinafter, the interface is denoted as "I/F".

The control unit 130 includes a CPU 132 and a memory 134. The CPU 132 is configured to execute a variety of processing in accordance with a program stored in the memory 134. The memory 134 consists of a volatile memory, a non-volatile memory and the like. Although not shown, the printer 100b has a configuration similar to the printer 100a.

(Configuration of Portable Device 200)

The portable device 200 is a device such as a portable phone (for example, a smart phone), a PDA, a notebook, a tablet PC, a portable music reproduction device, a portable moving picture reproduction device or the like. The portable device 200 is one example of a terminal device. Although not shown, the portable device 200 may have an application stored therein, in addition to an OS program for executing basic operations. The application may be installed in the portable device 200 from a server on the Internet provided by a vendor of the printers 100a, 100b or may be installed in the portable device 200 from a medium shipped together with the printers 100a, 100b.

(Configuration of Service Provision Servers 400a, 400b)

The service provision servers 400a, 400b are servers for providing a user of the printer (for example, 100a, 100b) with a service. Specifically, the service provision server 400a is a server for executing a charging service of charging a fee corresponding to the number of used printing media to the user. The service provision server 400b is a server for executing a dispatch service of a cartridge configured to accommodate therein disposables such as ink, toner and the like. The service provision server 400a is provided on the Internet 4 by the vendor of the printers 100a, 100b. In the meantime, the service provision server 400b is provided on the Internet 4 by a business operator different from the vendor of the printers 100a, 100b. The service provision servers 400a, 400b have service names SV1, SV2 indicative of services to be provided, respectively.

The service provision server 400a has a network IF 420 and a control unit 430. The network IF 420 is connected to the Internet 4. The control unit 430 includes a CPU 432 and a memory 434. The CPU 432 is configured to execute a variety of processing in accordance with a program 436 stored in the memory 434. The memory 434 is configured by a volatile memory, a non-volatile memory and the like. Although not shown, the service provision server 400b has a configuration similar to the service provision server 400a.

(Configuration of Management Server 500)

The management server 500 is a server for managing various kinds of information for providing a service from the service provision servers 400a, 400b to the user of the printer. The management server 500 is provided on the Internet 4 by the vendor of the printers 100a, 100b.

The management server 500 includes a network IF 520 and a control unit 530. The network IF 520 is connected to the Internet 4. The control unit 530 includes a CPU 532 and a memory 534. The CPU 532 is configured to execute a variety of processing in accordance with a program 536 stored in the memory 534. The memory 534 is configured by a volatile memory, a non-volatile memory and the like.

(Processing to be Executed by Each of Devices 100a to 500; FIGS. 2 to 7)

Registration processing that is to be executed by the respective devices 100a and the like is described with reference to FIGS. 2 to 7. Meanwhile, in the below, for easy understanding, when describing the processing that is to be executed in accordance with each of the programs 136, 436, 536 by each of the CPUs 132, 432, 532 of each of the devices 100a, 400a, 500, the device (for example, the printer 100a) is described as a main subject of the execution, not the CPU. Also, the respective devices 100a, 400a, 500 perform communication via the network IFs 120, 420, 520. Therefore, in the below, the description "via the network IF" is omitted.

Figure 2B:
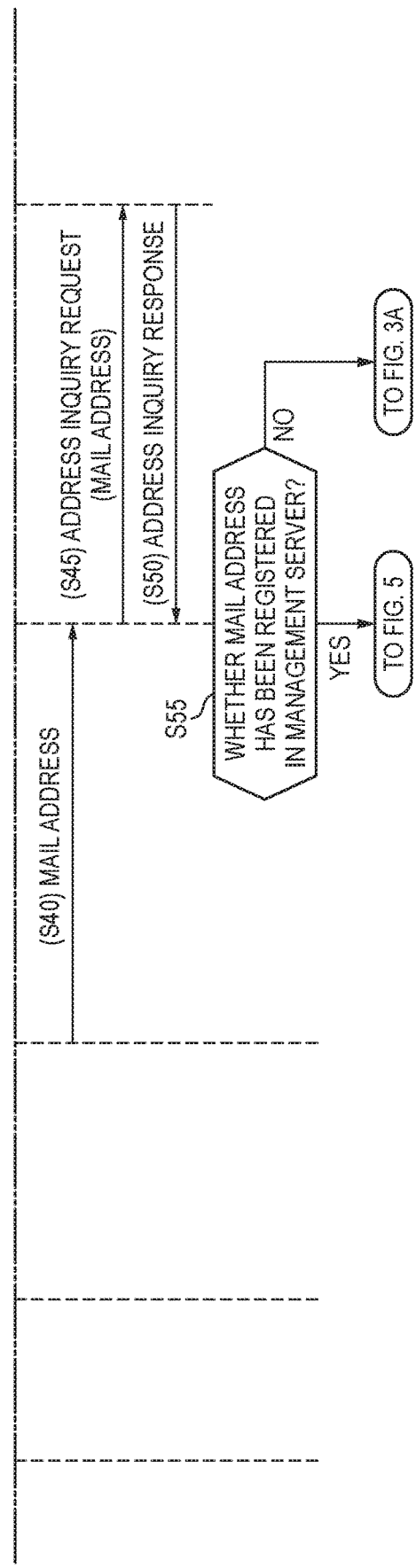

(Registration Processing; FIGS. 2A and 2B)

The registration processing is described with reference to FIGS. 2A and 2B. The registration processing is processing for registering user information for specifying the user of the printers 100a, 100b in the service provision server 400a and registering various kinds of information including the printer ID "X" for identifying the printer 100a in the management server 500.

In S3, the user of the printers 100a, 100b executes an activation operation for activating an application in the portable device 200 with the portable device 200. Thereby, the processing that is to be executed by the portable device 200 is implemented by the application. In S5, the user executes a search operation with the portable device 200. The search operation is an operation for searching the printer 100a, 100b belonging to the wireless LAN formed by the AP 300. As a result, in S15, the portable device 200 transmits a search signal to the wireless LAN in a broadcast manner.

When the search signal is received from the portable device 200, the printer 100a transmits a search response signal, which includes a printer name "AAA" and an IP address IPa allotted to the printer 100a, to the portable device 200, in S20. Likewise, when the search signal is received from the portable device 200, the printer 100b transmits a search response signal, which includes a printer name "BBB" and an IP address IPb allotted to the printer 100b, to the portable device 200, in S23.

When the respective search response signals are received from the respective printers 100a, 100b, the portable device 200 displays a printer selection screen SC1, in S25. The printer selection screen SC1 includes the printer names "AAA", "BBB" in the respective search response signals. In S30, the user selects the printer name "AAA" of the printer 100a, which is a registration target, on the printer selection screen SC1.

In S32, the portable device 200 displays a service selection screen SC2 for selecting a service. The service selection screen SC2 includes service names SV1, SV2, which are stored in advance in the application of the portable device 200. In S33, the user selects the service name SV1, which is to be provided by the service provision server 400a, on the service selection screen SC2.

In S34, the portable device 200 displays an address screen for inputting a mail address of the user. In S35, the user inputs a mail address on the address screen. Here, in the first illustrative embodiment, the mail address is an address set in a mailer application of the portable device 200. That is, when an electronic email is transmitted to the mail address, which is a destination, the portable device 200 can receive the electronic email.

In S40, the portable device 200 transmits the input mail address to the service provision server 400a corresponding to the selected service name SV1.

When the mail address is received from the portable device 200, the service provision server 400a transmits an address inquiry request including the mail address to the management server 500, in S45. The address inquiry request is a request for inquiring whether the mail address has been registered in the management server 500.

When the address inquiry request including the mail address is received from the service provision server 400a, the management server 500 determines whether the mail address has been registered in the management server 500, and transmits an address inquiry response indicative of a determination result to the service provision server 400a, in S50.

When the address inquiry response is received from the management server 500, the service provision server 400a determines whether the determination result in the address inquiry response indicates that the mail address has been registered in the management server 500, in S55. When the determination result in the address inquiry response indicates that the mail address has been registered in the management server 500, the service provision server 400a determines YES in S55 and proceeds to FIG. 5. On the other hand, when the determination result in the address inquiry response indicates that the mail address has not been registered in the management server 500, the service provision server 400a determines NO in S55 and proceeds to FIG. 3A.

Figure 3B:
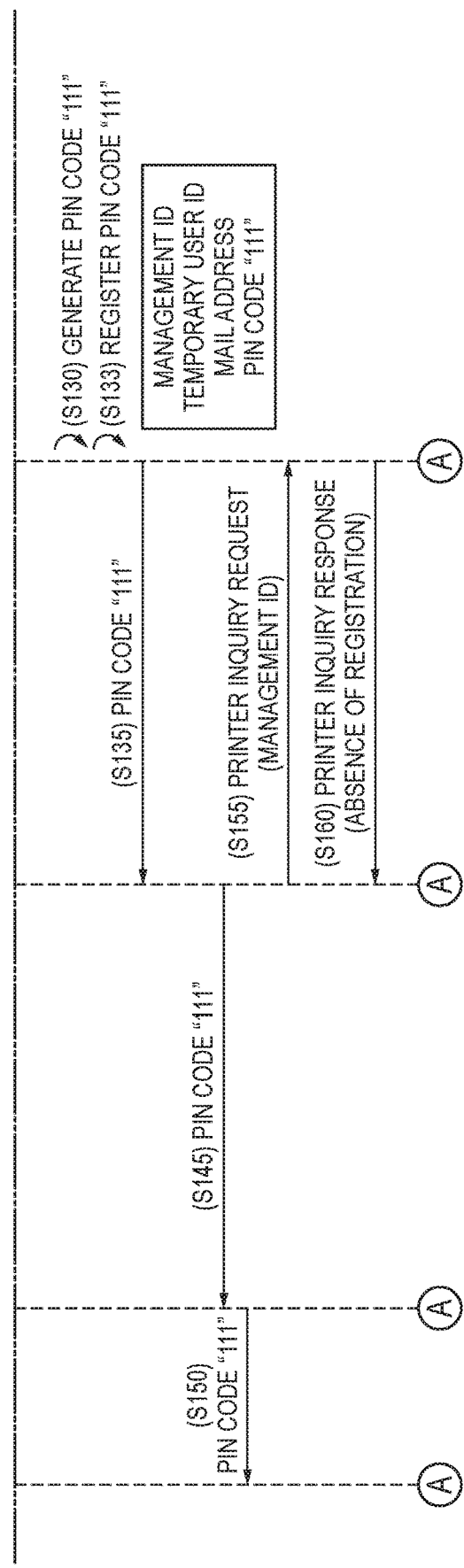

(FIGS. 3A and 3B Continuing from FIG. 2B)

In S105 of FIG. 3A, the service provision server 400a generates temporary account information. The temporary account information includes a temporary user ID including an arbitrary character string, and the mail address received in S40 of FIG. 2B. In S110, the service provision server 400a transmits a temporary registration request including the temporary account information to the management server 500. The temporary registration request is a request for registering the temporary account information in the management server 500.

When the temporary registration request is received from the service provision server 400a, the management server 500 registers the temporary account information of the temporary registration request in the memory 534, in S115. The management server 500 further generates a management ID for identifying the user, associates the management ID with the temporary account information and stores the same in the memory 534. In S120, the management server 500 transmits a temporary registration notification, which indicates that the temporary account information has been registered, and the management ID to the service provision server 400a.

When the temporary registration notification and the management ID are received from the management server 500, the service provision server 400a registers the management ID in the memory 434, in S123. In S125, the service provision server 400a transmits a PIN code request, which includes the mail address received in S40 of FIG. 2B, to the management server 500. The PIN code request is a request for registering the PIN code in the management server 500.

When the PIN code request is received from the service provision server 400a, the management server 50 generates a PIN code "111", which is a unique character string, in S130, associates the PIN code "111" with the temporary account information and stores the same in the memory 534, in S133. In S135, the management server 500 transmits the PIN code "111" to the service provision server 400a.

When the PIN code "111" is received from the management server 500, the service provision server 400a transmits the PIN code "111" to the portable device 200, in S145.

When the PIN code "111" is received from the service provision server 400a, the portable device 200 transmits the PIN code "111" to the IP address IPa (i.e., the IP address IPa of the printer 100a) in the search response signal received in S20 of FIG. 2A, which is a transmission destination, in S150.

After transmitting the PIN code "111" to the portable device 200, the service provision server 400a transmits a printer inquiry request including the management ID to the management server 500, in S155. The printer inquiry request is a request for inquiring whether the printer ID has been registered with being associated with the PIN code "111" in the management server 500.

When the printer inquiry request is received from the service provision server 400a, the management server 500 determines whether the printer ID has been registered with being associated with the management ID in the memory 534, and transmits a printer inquiry response indicative of a determination result to the service provision server 400a, in S160. At this time, since the printer ID has not been registered with being associated with the management ID in the memory 534, the printer inquiry response in S160 indicates the absence of registration.

Figure 4B:
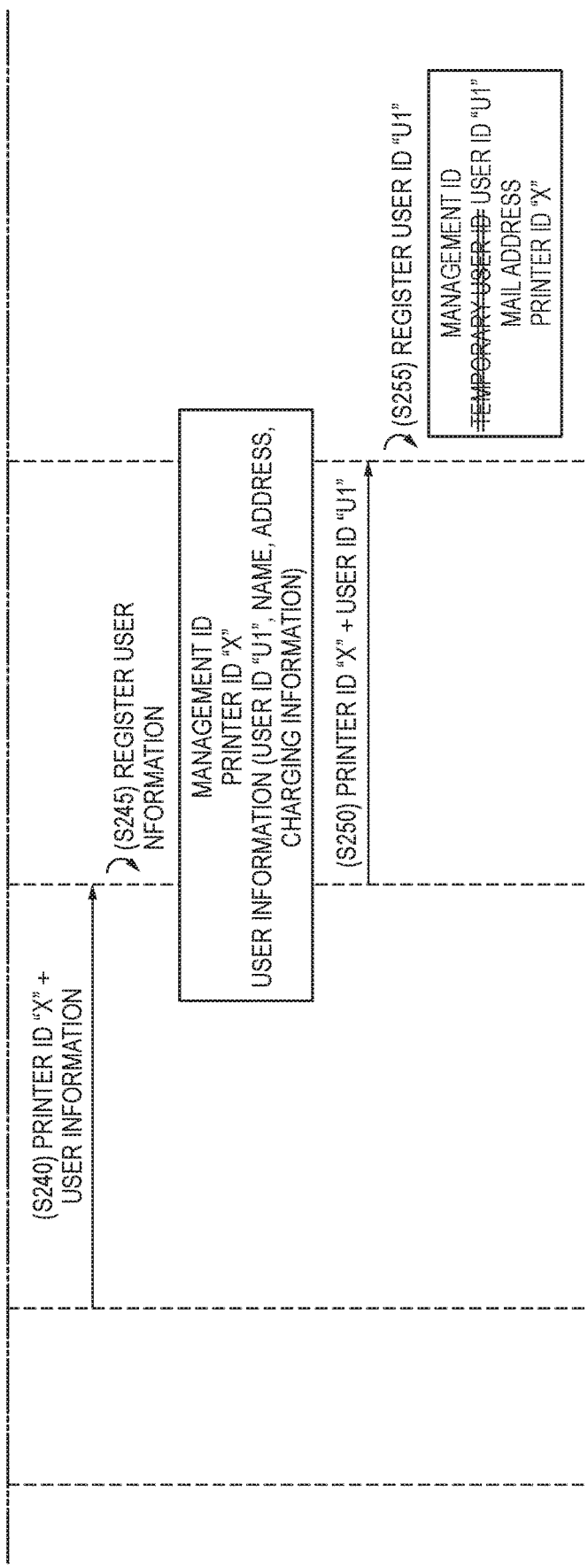

(FIGS. 4A and 4B Continuing from FIG. 3B)

When the PIN code "111" is received from the portable device 200 in S150 of FIG. 3B, the printer 100a transmits an ID registration request, which includes the PIN code "111" and the printer ID "X" of the printer 100a, to the management server 500 in S205 of FIG. 4A. The ID registration request is a request for registering the printer ID "X" in the management server 500.

When the ID registration request is received from the printer 100a, the management server 500 associates the printer ID "X" in the ID registration request with the PIN code "111" and registers the same in the memory 534, in S210. Thereby, in the memory 534, the temporary account information (i.e., the temporary user ID and the mail address), the PIN code "111" and the printer ID "X" are associated.

When the printer inquiry response indicative of the absence of registration is received from the management server 500, in S160 of FIG. 3B, the service provision server 400a again transmits the printer inquiry request to the management server 500, in S215 of FIG. 4A. That is, the service provision server 400a repetitively transmits the printer inquiry request to the management server 500 until the printer inquiry response indicative of the presence of registration is received, and when the printer inquiry response indicative of the presence of registration is received, the service provision server stops transmitting the printer inquiry request.

When the printer inquiry request is received from the service provision server 400a, in S215, the management server 500 determines that the printer ID "X" is registered with being associated with the PIN code "111" in the memory 534, and transmits a printer inquiry response including the printer ID "X", i.e., a printer inquiry response indicative of the presence of registration to the service provision server 400a, in S220. In S223, the management server 500 deletes the PIN code "111", which is not used in subsequent processing, from the memory 534.

When the printer inquiry response indicative of the presence of registration is received from the management server 500, the service provision server 400a associates the printer ID "X" in the printer inquiry response with the management ID and stores the same in the memory 434, in S224. In S225, the service provision server 400a transmits an electronic email, in which a URL indicating a position of an input page in the service provision server 400a is described in a body text, to a destination indicated by the mail address received in S40 of FIG. 2B. The URL includes a query character string indicative of the printer ID "X" in the printer inquiry response. The input page is a web page for inputting user information for specifying a user. In this way, since the service provision server 400a transmits the electronic email after checking that the printer ID "X" has been registered in the management server 500, the service provision server 400a does not transmit the electronic email in a situation where the printer ID "X" has not been registered in the management server 500 because the printer 100a is not connected to the Internet 4, for example. Therefore, the service provision server 400a can suppress execution of the useless communication.

As described above, according to the first illustrative embodiment, since the address is set in the portable device 200, when the electronic email is received from the service provision server 400a and the user activates the mailer application, the portable device 200 can display the electronic email. In S228, the user selects the URL described in the body text of the electronic email (for example, clicks the URL). In this case, in S230, the portable device 200 accesses the URL (i.e., accesses the service provision server 400a), receives input page data indicative of the input page from the service provision server 400a, and displays an input page expressed by the input page data. In S235, the user inputs user information, which includes a user ID "U1", a name, an address and charging information (for example, a number of a credit card of the user) designated by the user, to the input page. Then, in S240, the portable device 200 transmits the printer ID "X" described as a query character string in the URL and the input user information to the service provision server 400a.

When the printer ID "X" and the user information are received from the portable device 200, the service provision server 400a registers the user information in the memory 434, in S245. In S250, the service provision server 400a transmits the printer ID "X" and the user ID "U1" included in the user information to the management server 500.

When the printer ID "X" and the user ID "U1" are received from the service provision server 400a, the management server 500 associates the user ID "U1", rather than the temporary user ID, with the printer ID "X" and stores the same in the memory 534, in S255. Thereby, the management ID, the user ID "U1", the mail address and the printer ID "X" are associated in the memory 534. Since the user information including the user ID "U1" has been registered in the service provision server 400a, the user information and the like in the service provision server 400a and the mail address, the printer ID "X" and the like in the management server 500 are associated via the user ID "U1". As a result, the service provision server 400a can provide the user with a service, which corresponds to a situation of the printer 100a identified by the printer ID "X" in the management server 500, by using the user information in the service provision server 400a. This will be described later with reference to FIGS. 7A and 7B.

Figure 5:
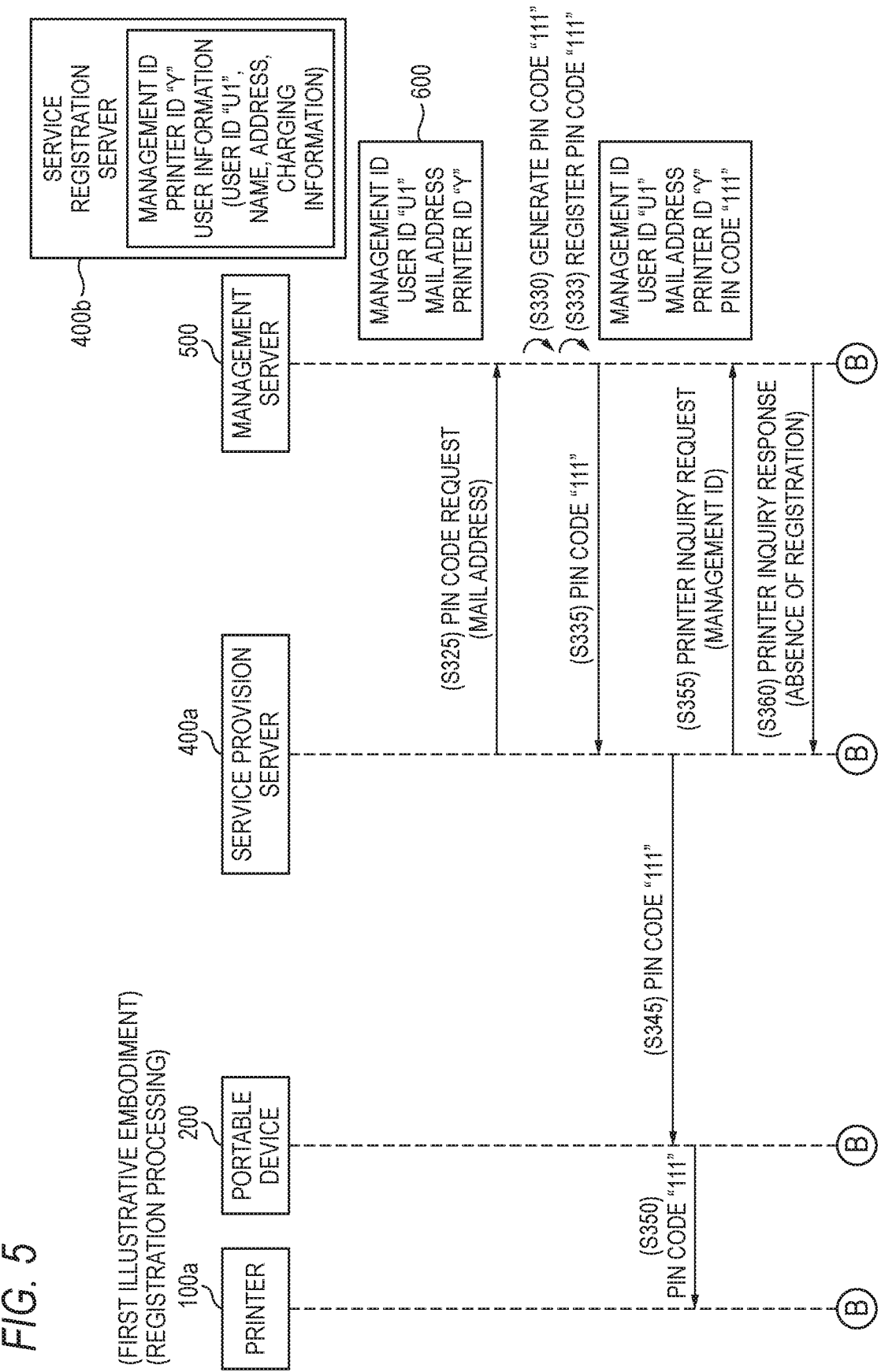
FIG. 5 depicts a sequence diagram of a case where a mail address has been registered in the management server.

(FIGS. 5, 6A and 6B Continuing from FIG. 2B)

Subsequently, processing, which is to be executed by each of the devices 100a and the like when a determination result in S55 of FIG. 2B is NO, i.e., when the mail address has been registered in the management server 500, is described with reference to FIGS. 5, 6A and 6B.

First, the reason for the situation where the mail address has been registered in the management server 500 is described. For example, a situation where a printer name "BBB" of the printer 100b instead of S30 of FIG. 2A is selected and a service name SV2 of the service provision server 400b instead of S33 is selected is assumed. In this case, the processing similar to FIGS. 2 to 4 is executed in the printer 100b, the portable device 200, the service provision server 400b and the management server 500. As a result, as shown with a reference numeral 400b in FIG. 5, the management ID, the printer ID "Y" and the user information are registered in the service provision server 400b (refer to S245 of FIG. 4B). Also, as shown with a reference numeral 600 in FIG. 5, the management ID, the user ID "U1", the mail address and the printer ID "Y" are registered with being associated in the management server 500 (refer to S255 of FIG. 4B). Thereafter, when the printer name "AAA" of the printer 100a is selected, as shown in S30 of FIG. 2A, the service name SV1 of the service provision server 400a is selected, as shown in S33, and the mail address registered in the management server 500 is input in S35, a determination result of S55 is YES and the processing of FIGS. 5 and 6 is executed.

In the situation where the mail address has been registered in the management server 500, the address inquiry response of S50 includes the management ID registered in the management server 500. When the address inquiry response including the management ID is received, the service provision server 400a registers the management ID in the memory 434.

In the situation where the mail address has not been registered in the management server 500, as described above, the service provision server 400a transmits the temporary registration request for registering the mail address in the management server 500 to the management server 500 (S110 in FIG. 3A). In contrast, in the situation shown in FIG. 5, i.e., in the situation where the mail address has been registered in the management server 500, the service provision server 400a does not transmit the temporary registration request to the management server 500. That is, the processing of S105 to S120 of FIG. 3A is not executed, and the service provision server 400a executes processing of S325 of FIG. 5. The processing of S325 to S333 is similar to the processing of S125 to S133 of FIGS. 3A and 3B. Thereby, the management ID, the user ID "U1", the mail address, the printer ID "Y" and the PIN code "111" are registered with being associated in the management server 500.

The processing of S335 of FIG. 5 to S445 of FIG. 6B is similar to the processing of S135 of FIG. 3B to S245 of FIG. 4B. Thereby, as shown in S410 and S423, the management ID, the user ID "U1", the mail address and the printer IDs "X" and "Y" are registered with being associated in the management server 500. Also, as shown in S424 and S445, the management ID, the printer ID "X" and the user information are registered in the service provision server 400a. In the meantime, since the user ID "U1" has been registered in the management server 500, the processing of S250 and S255 of FIG. 4B is omitted. Therefore, it is possible to suppress the user ID "U1" from being redundantly registered in the management server 500.

As shown in FIGS. 5 and 6, in the situation (NO in S55 of FIG. 2B) where the mail address has been registered in the management server 500, the mail address and the user ID "U1" are not redundantly registered in the management server 500. Therefore, it is possible to save the storage capacity of the memory 534 of the management server 500.

Figure 7A:
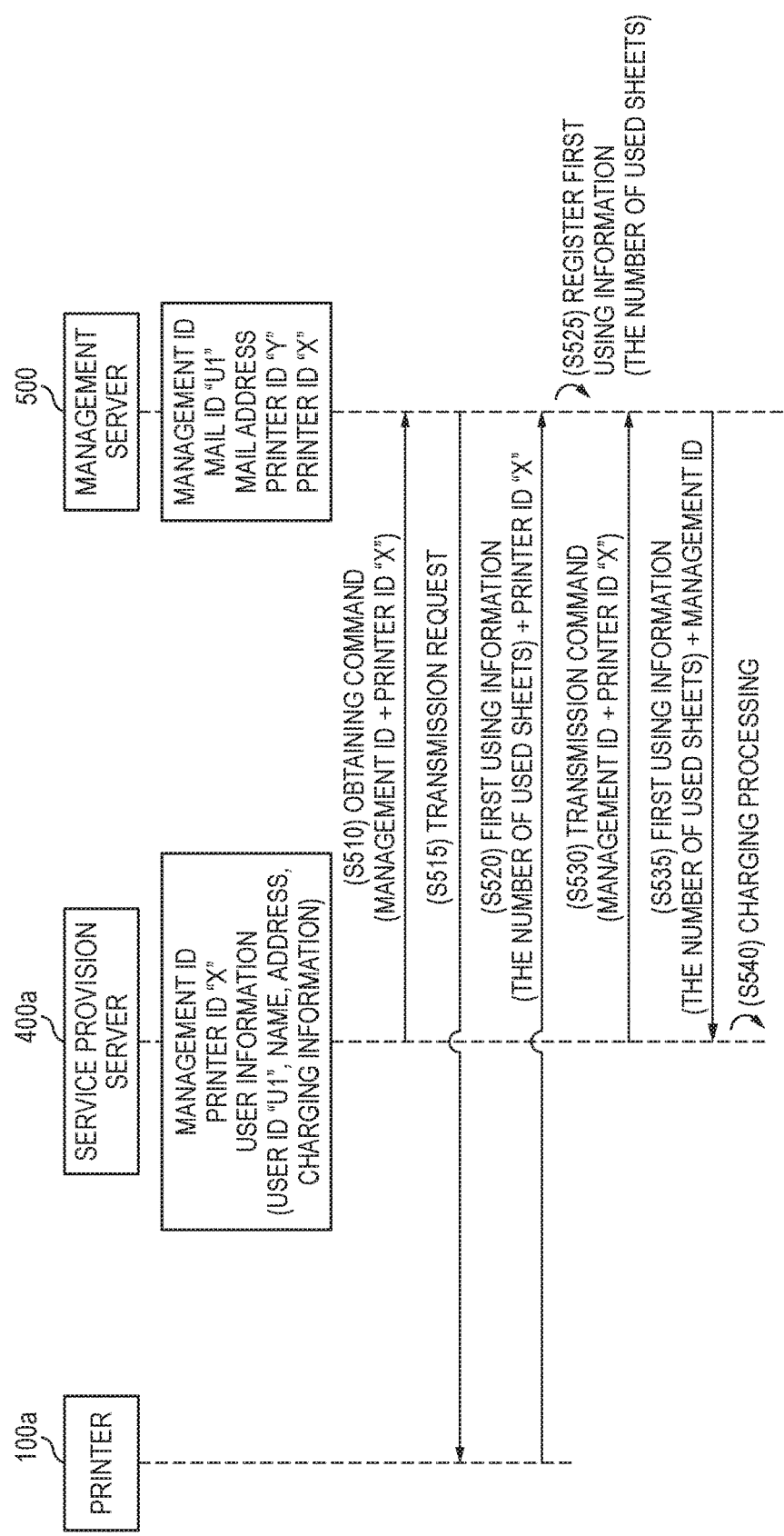

(Service Processing; FIGS. 7A and 7B)

Service processing that is to be executed by each of the devices 100a to 500 is described with reference to FIGS. 7A and 7B. The service processing is processing for providing a service from each of the service provision servers 400a, 400b to the user. The processing of FIGS. 7A and 7B is executed after the processing of FIGS. 6A and 6B. That is, in an initial state of FIG. 7A, the user information and the like has been registered in each of the service provision servers 400a, 400b, and the printer IDs "X", "Y" and the like have been registered in the management server 500.

In S510 of FIG. 7A, the service provision server 400a transmits an obtaining command, which includes the management ID corresponding to the user to which the service is to be provided and the printer ID "X" associated with the user, to the management server 500. The obtaining command of S510 is a command for instructing the management server 500 to obtain first using information (specifically, the cumulative number of used sheets of a printing medium used by a printer) relating to the service using.

When the obtaining command is obtained from the service provision server 400a, the management server 500 transmits a transmission request to the printer 100a identified by the printer ID "X" in the obtaining command, in S515. The transmission request in S515 is a command for requesting the printer 100a to transmit the first using information.

When the transmission request is received from the management server 500, the printer 100a specifies the first using information indicated by the transmission request, and transmits the specified first using information and the printer ID "X" to the management server 500, in S520.

When the first using information and the printer ID "X" are received from the printer 100a, the management server 500 associates the first using information with the printer ID "X" and registers the same in the memory 534, in S525.

In S530, the service provision server 400a transmits a transmission command including the management ID and printer ID "X" to the management server 500. The transmission command is a command for requesting the management server 500 to transmit the first using information.

When the transmission command is received from the service provision server 400a, the management server 500 transmits the first using information and the management ID associated with the printer ID "X" in the transmission command to the service provision server 400a, in S535.

When the first using information and the management ID are received from the management server 500, the service provision server 400a executes charging processing in S540, based on the number of used sheets indicated by the using information and the user information.

The processing of S610 to S635 is similar to the processing of S510 to S535, except that the printer 100b, the service provision server 400b and second using information indicative of a remaining amount of disposable are used. In S640, the service provision server 400b executes dispatch processing of a disposable cartridge, based on the remaining amount of disposable indicated by the second using information and the user information.

In this way, the service provision servers 400a, 400b can provide the user with the charging service and the dispatch service, respectively.

Advantages of First Illustrative Embodiment

Figure 8B:
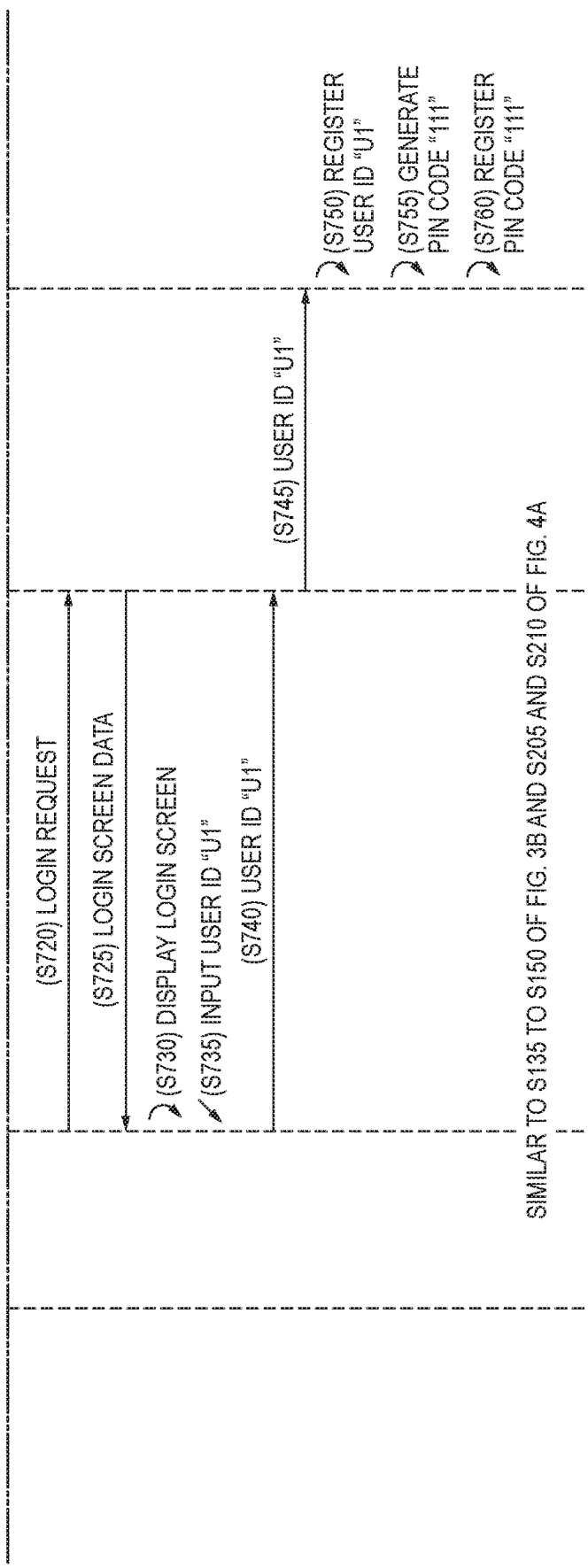

A comparative example for associating and registering the user information and the printer ID is described with reference to FIG. 8. Devices 201, 401a, 501 of FIG. 8 have the configurations similar to the devices 200, 400a, 500. The processing of S703 is similar to the processing of S3 in FIG. 2A. In S705, the user executes a user registration operation for registering the user information in the service provision server 401a with the portable device 201.

The portable device 201 transmits a registration screen request to the service provision server 401a in S707, receives user registration screen data from the service provision server 401a in S708, and displays a user registration screen expressed by the user registration screen data in S709. In S710, the user inputs the user information to the user registration screen.

The service provision server 401a receives the user information from the portable device 201 in S713, and registers the user information in S715. Then, the processing similar to the processing of S5 to S33 in FIG. 2A is executed.

The portable device 201 requests a login request to the service provision server 401a in S720, receives login screen data from the service provision server 401a in S725, and displays a login screen expressed by the login screen data in S730. In S735, the user inputs the user ID "U1" included in the registered user information to the login screen.

The service provision server 401a receives the user ID "U1" from the portable device 201 in S740, and transmits the user ID "U1" to the management server 501 in S745.

In S750, the management server 501 registers the user ID "U1". The processing of S755 is similar to the processing of S130 in FIG. 3B. In S760, the management server 501 associates the PIN code "111" with the user ID "U1" and registers the same. Then, the processing similar to S135 to S150 of FIG. 3B and S205 and S210 of FIG. 4A is executed. Like this, in the comparative example, the user should execute the search operation and the like for registering the printer ID "X" and the like in the management server 501 (S5 and the like) after executing the user registration operation (S705 of FIG. 8) for registering the user information in the service provision server 401a. After the user registration operation is executed, the user is not urged to execute the search operation and the like. Therefore, the user may not realize that it is necessary to execute the search operation and the like.

On the other hand, in the first illustrative embodiment, when the mail address is received from the portable device 200 (S40 in FIG. 2B), the service provision server 400a transmits the PIN code "111" to the portable device 200 (S145 in FIG. 3B). When the PIN code "111" is received from the portable device 200 (S150), the printer 100a transmits the PIN code "111" and the printer ID "X" to the management server 500 (S205 in FIG. 4A, S405 in FIG. 6A). When the PIN code "111" and the printer ID "X" are received from the printer 100a, the management server 500 registers the printer ID "X" in the memory 534 of the management server 500 (S210 in FIG. 4A, S410 in FIG. 6A). Also, when the mail address is received from the portable device 200, the service provision server 400a transmits the URL to the destination indicated by the mail address (S225 in FIG. 4A, S425 in FIG. 6A), receives the user information from the portable device 200 (S240 in FIG. 4B, S440 in FIG. 6B), and registers the user information in the memory 434 of the service provision server 400a (S245 in FIG. 4B, S445 in FIG. 6B). Thereby, the communication system 2 can associate and register the user information in the memory 434 of the service provision server 400a and the printer ID "X" in the memory 534 of the management server 500.

Also, in the first illustrative embodiment, the user may input the user information in accordance with the electronic email received from the service provision server 400a after the search operation and the like are executed (S225 to S235 in FIG. 4A). That is, according to the first illustrative embodiment, the user can more easily understand the operation to be executed, as compared to the comparative example, so that the user's convenience is improved.

The service provision server 400a and the printers 100a, 100b are respectively examples of "the registration server", "the first target device", and "the second target device". The portable device 200 is an example of "the communication device". The e-mail address, the PIN code "111", the input page, and the URL are respectively examples of "the destination information", "the authentication information", "the input screen", and "the screen relating information". The user ID is an example of "the specific information" and "the user identification information". The printer ID "X" and the printer ID "Y" are respectively examples of "the first device identification information" and "the second device identification information". The PIN code request and the temporary registration request are respectively examples of "the first registration request" and "the second registration request". The printer inquiry request, the printer inquiry response, the address inquiry request, and the address inquiry response are respectively examples of "the first inquiry request", "the first inquiry response", "the second inquiry request", and "the second inquiry response".

The processing of S40, S45 and S50 in FIG. 2B is an example of the processing that is to be executed by "the destination information receiving unit", "the second inquiry unit" and "the response receiving unit", respectively. The processing of S110 in FIG. 3A is an example of the processing that is to be executed by "the second registration request transmission unit". The processing of S125 in FIG. 3A and S325 in FIG. 5 is an example of the processing that is to be executed by "the first registration request transmission unit". The processing of S145 in FIG. 3B and S345 in FIG. 5 is an example of the processing that is to be executed by "the authentication information transmission unit". The processing of S150 in FIG. 3B and S350 in FIG. 5 is an example of the processing that is to be executed by "the authentication information receiving unit". The processing of S155 in FIG. 3B, S215 in FIG. 4A, S355 in FIG. 5 and S415 in FIG. 6A is an example of the processing that is to be executed by "the first inquiry unit". The processing of S205 in FIG. 4A and S405 in FIG. 6A is an example of the processing that is to be executed by "the device identification information transmission unit" and "the device identification information receiving unit". The processing of S210 in FIG. 4A and S410 in FIG. 6A is an example of the processing that is to be executed by "the device identification information registration unit". The processing of S225 in FIG. 4A and S425 in FIG. 5 is an example of the processing that is to be executed by "the screen relating information transmission unit". The processing of S240 in FIG. 4B and S440 in FIG. 6B is an example of the processing that is to be executed by "the user information receiving unit". The processing of S245 in FIG. 4B and S445 in FIG. 6B is an example of the processing that is to be executed by "the user information registration unit". The processing of S250 in FIG. 4B is an example of the processing that is to be executed by "the user identification information transmission unit".

Second Illustrative Embodiment

Differences from the first illustrative embodiment are described. In the second illustrative embodiment, the printer 100a, rather than the portable device 200, transmits the mail address to the service provision server 400a.

(Registration Processing; FIG. 9)

The registration processing of the second illustrative embodiment is described with reference to FIG. 9. In S805, the user executes an information registration operation for registering the information in each of the servers with the printer 100a. The processing of S808 to S815 is similar to the processing of S32 to S35 in FIG. 2A, except that the subject of the processing is the printer 100a.

In S840, the printer 100a transmits the mail address to the service provision server 400a.

When the mail address is received from the printer 100a, the service provision server 400a executes the processing similar to S45 and S50 of FIG. 2B, and determines whether the mail address has been registered in the management server 500, in S855. When the address inquiry response indicates that the mail address has been registered, the service provision server 400a determines YES in S855, and proceeds to S325 in FIG. 5. On the other hand, when the address inquiry response indicates that the mail address has not been registered, the service provision server 400a determines NO in S855, and proceeds to S105 in FIG. 3A.

In the second illustrative embodiment, in the case that the service provision server 400a proceeds to S105 in FIG. 3A, the service provision server 400a transmits the PIN code "111" to the printer 100a, in S145 and S150. Also, in the case that the service provision server 400a proceeds to S325 in FIG. 5, the service provision server 400a transmits the PIN code "111" to the printer 100a.

Advantages of Second Illustrative Embodiment

Also in the second illustrative embodiment, like the first illustrative embodiment, the communication system 2 can associate and register the user information in the memory 434 of the service provision server 400a and the printer ID "X" in the memory 534 of the management server 500. Also, in the second illustrative embodiment, since it is not necessary to execute the operation and processing of S5 to S30 for selecting a printer, it is possible to promptly register the user information, the printer ID and the like. The processing of S840 in FIG. 9 is an example of the processing that is to be executed by "the destination information receiving unit".

Although the specific examples of the disclosure have been described in detail, they are just exemplary and do not limit the claims. The technology of the claims includes a variety of changes and modifications of the specific examples. Modified embodiments of the illustrative embodiments are described below.

Modified Embodiment 1

In the respective illustrative embodiments, the service provision server 400a may receive a phone number of the user from the portable device 200, instead of the mail address, in S40 of FIG. 2B and S840 of FIG. 9. Also, the service provision server 400a may transmit the URL to a destination, which is indicated by the phone number, by using a short message service in S225 of FIG. 4A and S425 of FIG. 6A. That is, the "destination information" may be a phone number or the like.

Modified Embodiment 2

In the respective illustrative embodiments, the service provision server 400a may transmit the input page data expressing the input page, instead of the URL, in S225 of FIG. 4A and S425 in FIG. 6A. That is, the "screen relating information" may be the input page data or the like.

Modified Embodiment 3

In the respective illustrative embodiments, the mail address corresponds to (i.e., is set in) the portable device 200. However, in a modified embodiment, for example, the main address may be set in a PC different from the portable device 200. In this case, the processing of S228 to S240 of FIG. 4B and S428 to S440 of FIGS. 6A and 6B is executed for the PC, rather than the portable device 200. That is, the "terminal device" may be a PC or the like.

Modified Embodiment 4

In the respective illustrative embodiments, the service provision server 400a may transmit the URL at any timing after the mail address is received (S40 in FIG. 2B) until the PIN code "111" and the like are transmitted (S145 in FIG. 3B, S345 in FIG. 5). That is, the "screen relating information" may be transmitted before the authentication information is transmitted.

Modified Embodiment 5

The management server 500 may be configured integrally with the service provision server 400a. In this case, the communication between the servers 400a, 500 is omitted, and the information such as the user information, the printer ID and the like are registered in one memory 434. That is, the "information management server" may be configured integrally with the registration server.

Modified Embodiment 6

In the respective illustrative embodiments, the printer ID "X" and the like in the management server 500 and the user information in the service provision server 400a are associated via the user ID "U1". However, it can be said that the information is also associated via the management ID. That is, the "specific information" may be the management ID, for example. Also, in the respective illustrative embodiments, the management server 500 may register the mail address received in S40 of FIG. 2B in the memory 534 and may register the PIN code "111" received in S135 of FIG. 3B and S335 of FIG. 5 in the memory 534. In this case, the printer ID "X" and the like in the management server 500 and the user information in the service provision server 400a are associated via the mail address or the PIN code "111". That is, the "specific information" may be the mail address, the PIN code "111" or the like. Also, in this case, since the "user identification information" is not necessarily required to be transmitted to the information management server, the "identification information transmission unit" may be omitted.

Modified Embodiment 7

In the illustrative embodiments, the CPUs 132, 432, 532 of the respective devices 100a, 400a, 500 implement the respective processing of FIGS. 2 to 7 and 9 by executing the programs 136, 436, 536 (i.e., software). Instead of this configuration, at least one processing of the respective processing of FIGS. 2 to 7 and 9 may be implemented by the hardware such as a logical circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness

What is claimed is:

1. A communication system comprising:
a registration server;
an information management server; and
a first target device,
wherein the registration server comprises:
  a processor; and
  a memory storing instructions, the instructions, when executed by the processor, causing the registration server to perform:
    receiving, from a communication device, destination information of a user of the first target device;
    in response to receiving the destination information from the communication device, transmitting authentication information to the communication device and transmitting screen relating information to a destination indicated by the destination information, the screen relating information relating to an input screen for inputting user information specifying the user;
    in response to the input screen being displayed on the communication device corresponding to the destination indicated by the destination information and the communication device receiving the user information through the input screen, receiving the user information from the communication device; and
    in response to receiving the user information from the communication device, registering the user information in the memory of the registration server,
wherein the first target device comprises:
  a control device configured to:
    receive the authentication information from the communication device after the communication device receives the authentication information from the registration server; and
    in response to receiving the authentication information from the communication device, transmit the authentication information and first device identification information to the information management server, the first device identification information identifying the first target device,
wherein the information management server comprises:
  a processor; and
  a memory storing instructions, the instructions, when executed by the processor, causing the information management server to perform:
    receiving the authentication information and the first device identification information from the first target device; and
    in response to receiving the authentication information and the first device identification information from the first target device, registering the first device identification information in the memory of the information management server, and
wherein the user information in the memory of the registration server and the first device identification information in the memory of the information management server are registered with being associated with each other.

2. A communication system comprising:
a registration server;
an information management server; and
a first target device,
wherein the registration server comprises:
  a processor; and
  a memory storing instructions, the instructions, when executed by the processor, causing the registration server to perform:
    receiving, from the first target device, destination information of a user of the first target device;
    in response to receiving the destination information from the first target device, transmitting authentication information to the first target device and transmitting screen relating information to a destination indicated by the destination information, the screen relating information relating to an input screen for inputting user information specifying the user;
    in response to the input screen being displayed on a communication device corresponding to the destination indicated by the destination information and the communication device receiving the user information through the input screen by the user, receiving the user information from the communication device; and
    in response to receiving the user information from the communication device, registering the user information in the memory of the registration server,
wherein the first target device comprises:
  a control device configured to:
    receive the authentication information from the registration server; and
    in response to receiving the authentication information from the registration server, transmit the authentication information and first device identification information to the information management server, the first device identification information identifying the first target device,
wherein the information management server comprises:
  a processor; and
  a memory storing instructions, the instructions, when executed by the processor, causing the information management server to perform:
    receiving the authentication information and the first device identification information from the first target device; and
    in response to receiving the authentication information and the first device identification information from the first target device, registering the first device identification information in the memory of the information management server, and
wherein the user information in the memory of the registration server and the first device identification information in the memory of the information management server are registered with being associated with each other.

3. A registration server comprising:
a processor; and
a memory storing instructions, the instructions, when executed by the processor, causing the registration server to perform:
receiving, from a communication device, destination information of a user of a first target device; and
in response to receiving the destination information from the communication device, associating and registering user information specifying the user and first device identification information specifying the first target device, wherein the registering of the user information comprises:
transmitting authentication information to the communication device, wherein in response to transmitting the authentication information to the communication device, the first target device receives the authentication information from the communication device, and an information management server receives the authentication information and the first device identification information from the first target device;
transmitting screen relating information to a destination indicated by the destination information, the screen relating information relating to an input screen for inputting the user information; and
in response to the input screen being displayed on a communication device corresponding to the destination indicated by the destination information and the communication device receiving the user information through the input screen, receiving the user information from the communication device, and
wherein in response to the information management server receiving the authentication information and the first device identification information from the first target device and the registration server receiving the user information from the communication device, the user information and the first device identification information are registered with being associated with each other.

4. The registration server according to claim 3, wherein the transmitting of the screen relating information comprises transmitting the screen relating information to the destination indicated by the destination information after the authentication information is transmitted.

5. The registration server according to claim 3,
wherein the information management server is configured separately from the registration server,
wherein in response to the information management server receiving the authentication information and the first device identification information from the first target device, the first device identification information is registered in a memory of the information management server,
wherein the registering of the user information further comprises:
in response to receiving the user information from the communication device, registering the user information in a memory of the registration server, and
wherein the user information in the memory of the registration server and the first device identification information in the memory of the information management server are associated via specific information.

6. The registration server according to claim 5,
wherein the registering of the user information further comprises:
transmitting, to the information management server, a first registration request for registering the authentication information in the memory of the information management server, and
wherein in response to the information management server receiving the authentication information and the first device identification information from the first target device after the authentication information is registered in the memory of the information management server, the first device identification information is registered in the memory of the information management server.

7. The registration server according to claim 5,
wherein the specific information is user identification information identifying the user,
wherein in response to receiving the user information comprising the user identification information from the communication device, the registering of the user information comprises registering the user information comprising the user identification information in the memory of the registration server,
wherein the registering of the user information further comprises:
in response to receiving the user information comprising the user identification information from the communication device, transmitting the user identification information to the information management server,
wherein in response to the information management server receiving the authentication information and the first device identification information from the first target device and the information management server receiving the user identification information from the registration server, the first device identification information and the user identification information are registered with being associated in the memory of the information management server, and
wherein the user information in the memory of the registration server and the first device identification information in the memory of the information management server are associated via the user identification information.

8. The registration server according to claim 5, wherein the transmitting of the screen relating information comprises transmitting the screen relating information to the destination indicated by the destination information after the first device identification information is registered in the memory of the information management server.

9. The registration server according to claim 8,
wherein in response to the information management server receiving the authentication information and the first device identification information from the first target device, the authentication information and the first device identification information are registered with being associated in the memory of the information management server,
wherein the registering of the user information further comprises:
transmitting a first inquiry request comprising the authentication information to the information management server after the authentication information is transmitted, the first inquiry request being an inquiry for inquiring whether the authentication information and the first device identification information are registered with being associated in the memory of the information management server, and
wherein in response to receiving a first inquiry response from the information management server, the transmitting of the screen relating information comprises transmitting the screen relating information to the destination indicated by the destination information, the first inquiry response being received in response to transmitting the first inquiry request to the information management server, the first inquiry response indicating that the authentication information and the first device identification information are registered with being associated.

10. The registration server according to claim 5,
wherein the registering of the user information further comprises:
transmitting, to the information management server, a second inquiry request comprising the destination information, the second inquiry request being an inquiry for inquiring whether the destination information is registered in the memory of the information management server;
in response to transmitting the second inquiry request to the information management server, receiving a second inquiry response from the information management server; and
in response to receiving the second inquiry response indicating that the destination information is not registered in the memory of the information management server, transmitting, to the information management server, a second registration request for registering the destination information in the memory of the information management server,
wherein in response to the information management server receiving the authentication information and the first device identification information from the first target device and the information management server receiving the second registration request from the registration server, the first device identification information and the destination information are registered with being associated in the memory of the information management server,
wherein in response to receiving the second inquiry response indicating that the destination information is registered under a condition that second device identification information for identifying a second target device that is different from the first target device and the destination information are registered with being associated in the information management server, the transmitting of the second registration request does not transmit the second registration request to the information management server, and
wherein in response to the information management server receiving the authentication information and the first device identification information from the first target device without having received the second registration request from the registration server, the first device identification information, the second device identification information and the destination information are registered with being associated in the memory of the information management server.

11. A registration server comprising:
a processor; and
a memory storing instructions, the instructions, when executed by the processor, causing the registration server to perform:
receiving, from the first target device, destination information of a user of a first target device; and
in response to receiving the destination information from the first target device, associating and registering user information specifying the user and first device identification information specifying the first target device,
wherein the registering of the user information comprises:
transmitting authentication information to the first target device, wherein in response to transmitting the authentication information to the first target device, the information management server receives the authentication information and the first device identification information from the first target device;
transmitting screen relating information to a destination indicated by the destination information, the screen relating information relating to an input screen for inputting the user information; and
in response to the input screen being displayed on a communication device corresponding to the destination indicated by the destination information and the communication device receiving the user information through the input screen, receiving the user information from the communication device, and
wherein in response to the information management server receiving the authentication information and the first device identification information from the first target device and the registration server receiving the user information from the communication device, the user information and the first device identification information are registered with being associated with each other.

12. The registration server according to claim 11, wherein the transmitting of the screen relating information comprises transmitting the screen relating information to the destination indicated by the destination information after the authentication information is transmitted.

13. The registration server according to claim 11,
wherein the information management server is configured separately from the registration server,
wherein in response to the information management server receiving the authentication information and the first device identification information from the first target device, the first device identification information is registered in a memory of the information management server,
wherein the registering of the user information further comprises:
in response to receiving the user information from the communication device, registering the user information in a memory of the registration server, and
wherein the user information in the memory of the registration server and the first device identification information in the memory of the information management server are associated via specific information.

14. The registration server according to claim 13,
wherein the registering of the user information further comprises:
transmitting, to the information management server, a first registration request for registering the authentication information in the memory of the information management server, and
wherein in response to the information management server receiving the authentication information and the first device identification information from the first target device after the authentication information is registered in the memory of the information management server, the first device identification information is registered in the memory of the information management server.

15. The registration server according to claim 13,
wherein the specific information is user identification information identifying the user,
wherein in response to receiving the user information comprising the user identification information from the communication device, the registering of the user information comprises registering the user information comprising the user identification information in the memory of the registration server,
wherein the registering of the user information further comprises:

in response to receiving the user information comprising the user identification information from the communication device, transmitting the user identification information to the information management server, wherein in response to the information management server receiving the authentication information and the first device identification information from the first target device and the information management server receiving the user identification information from the registration server, the first device identification information and the user identification information are registered with being associated in the memory of the information management server, and wherein the user information in the memory of the registration server and the first device identification information in the memory of the information management server are associated via the user identification information.

16. The registration server according to claim 13, wherein the transmitting of the screen relating information comprises transmitting the screen relating information to the destination indicated by the destination information after the first device identification information is registered in the memory of the information management server.

17. The registration server according to claim 16, wherein in response to the information management server receiving the authentication information and the first device identification information from the first target device, the authentication information and the first device identification information are registered with being associated in the memory of the information management server, wherein the registering of the user information further comprises:

transmitting a first inquiry request comprising the authentication information to the information management server after the authentication information is transmitted, the first inquiry request being an inquiry for inquiring whether the authentication information and the first device identification information are registered with being associated in the memory of the information management server, and wherein in response to receiving a first inquiry response from the information management server, the transmitting of the screen relating information comprises transmitting the screen relating information to the destination indicated by the destination information, the first inquiry response being received in response to transmitting the first inquiry request to the information management server, the first inquiry response indicating that the authentication information and the first device identification information are registered with being associated.

18. The registration server according to claim 13, wherein the registering of the user information further comprises:

transmitting, to the information management server, a second inquiry request comprising the destination information, the second inquiry request being an inquiry for inquiring whether the destination information is registered in the memory of the information management server;

in response to transmitting the second inquiry request to the information management server, receiving a second inquiry response from the information management server; and in response to receiving the second inquiry response indicating that the destination information is not registered in the memory of the information management server, transmitting, to the information management server, a second registration request for registering the destination information in the memory of the information management server, wherein in response to the information management server receiving the authentication information and the first device identification information from the first target device and the information management server receiving the second registration request from the registration server, the first device identification information and the destination information are registered with being associated in the memory of the information management server, wherein in response to receiving the second inquiry response indicating that the destination information is registered under a condition that second device identification information for identifying a second target device that is different from the first target device and the destination information are registered with being associated in the information management server, the transmitting of the second registration request does not transmit the second registration request to the information management server, and wherein in response to the information management server receiving the authentication information and the first device identification information from the first target device without having received the second registration request from the registration server, the first device identification information, the second device identification information and the destination information are registered with being associated in the memory of the information management server.

* * * * *